United States Patent
Nakamura et al.

(10) Patent No.: US 9,293,751 B2
(45) Date of Patent: Mar. 22, 2016

(54) MICROPOROUS STRETCHED CELLULOSE NANOFIBER-CONTAINING POLYOLEFIN FILM, METHOD FOR PRODUCING MICROPOROUS STRETCHED CELLULOSE NANOFIBER-CONTAINING POLYOLEFIN FILM, AND SEPARATOR FOR NONAQUEOUS SECONDARY BATTERIES

(75) Inventors: Satoru Nakamura, Hiroshima (JP); Yoshiyuki Kushizaki, Hiroshima (JP); Ryou Ishiguro, Hiroshima (JP); Mariko Yoshioka, Kyoto (JP)

(73) Assignee: THE JAPAN STEEL WORKS, LTD., Tokyo (JP)

( * ) Notice: Subject to any disclaimer, the term of this patent is extended or adjusted under 35 U.S.C. 154(b) by 92 days.

(21) Appl. No.: 14/343,118

(22) PCT Filed: Sep. 6, 2012

(86) PCT No.: PCT/JP2012/072739
§ 371 (c)(1),
(2), (4) Date: Mar. 6, 2014

(87) PCT Pub. No.: WO2013/035786
PCT Pub. Date: Mar. 14, 2013

(65) Prior Publication Data
US 2014/0227605 A1    Aug. 14, 2014

(30) Foreign Application Priority Data
Sep. 7, 2011    (JP) .................. 2011-194754

(51) Int. Cl.
| | |
|---|---|
| H01M 2/16 | (2006.01) |
| B29C 47/00 | (2006.01) |
| B82Y 30/00 | (2011.01) |
| H01M 2/14 | (2006.01) |
| H01M 10/0525 | (2010.01) |

(52) U.S. Cl.
CPC ......... *H01M 2/1633* (2013.01); *B29C 47/0057* (2013.01); *B82Y 30/00* (2013.01); *H01M 2/145* (2013.01); *H01M 2/162* (2013.01); *H01M 2/1653* (2013.01); *H01M 10/0525* (2013.01)

(58) Field of Classification Search
CPC . H01M 2/145; H01M 2/1633; B29C 47/0057
USPC ....................................................... 429/254
See application file for complete search history.

(56) References Cited

U.S. PATENT DOCUMENTS

| | | | |
|---|---|---|---|
| 2007/0190303 A1 | 8/2007 | Lee et al. | |
| 2009/0081543 A1* | 3/2009 | Takita et al. | ............ 429/188 |
| 2011/0311856 A1 | 12/2011 | Matsui et al. | |
| 2013/0011663 A1 | 1/2013 | Imai et al. | |

FOREIGN PATENT DOCUMENTS

| | | |
|---|---|---|
| CN | 101309953 A | 11/2008 |
| JP | 4-126352 A | 4/1992 |
| JP | 6-80832 A | 3/1994 |
| JP | 10-050287 A | 2/1998 |
| JP | 2001-229908 A | 8/2001 |
| JP | 2003-123724 A | 4/2003 |
| JP | 2004-269579 A | 9/2004 |
| JP | 2006-49797 A | 2/2006 |
| JP | 2009-293167 A | 12/2009 |
| WO | 2010/008003 A1 | 1/2010 |
| WO | 2011/118361 A1 | 9/2011 |
| WO | 2012/017954 A1 | 2/2012 |

OTHER PUBLICATIONS

Office Action, Issued by the State Intellectual Property Office of P.R. China, Dated Sep. 28, 2014, In counterpart Chinese Application No. 201280043602.4.
International Search Report, dated Nov. 13, 2012, issued by the International Searching Authority in counterpart International Application No. PCT/JP2012/072739.
Written Opinion, dated Nov. 13, 2012, issued by the International Searching Authority in counterpart International Application No. PCT/JP2012/072739.

* cited by examiner

*Primary Examiner* — Hui Chin
(74) *Attorney, Agent, or Firm* — Sughrue Mion, PLLC (57) ABSTRACT

The present invention provides a production method and the like of a microporous stretched film having a high puncture strength and the like. The method includes: a first step of melt-kneading a cellulose nanofiber and a polyolefin resin to thereby disperse the nanofiber in the resin; a second step of removing water from a kneaded mixture obtained in the first step; a third step of mixing a plasticizer in the nanofiber and the resin and melt-kneading them to prepare a polyolefin resin composition; a fourth step of extrusion-molding the polyolefin resin composition; a fifth step of stretching an extrusion-molded article obtained in the fourth step to form a film; and a sixth step of extracting the plasticizer from the film.

8 Claims, 4 Drawing Sheets

Fig. 1

(Stretching Situation with Small-Size Stretcher)

Fig. 2

(SEM Image of Cellulose Nanofiber-Compounded Separator (starting material: Avicel))

*Fig. 3*

(DSC Data of Samples)

*Fig. 4*

(Comparison of Thermal Fixation Effect in DSC)

*Fig. 5*

Front View (Schematic View of Device for Measuring Shut-Down Temperature and Short-Circuit Temperature)

*Fig. 6*

Side View (Schematic View of Device for Measuring Shut-Down Temperature and Short-Circuit Temperature)

*Fig. 7*

(TG-DTA Data Measured in Comparative Example 2 and Example 5)

MICROPOROUS STRETCHED CELLULOSE NANOFIBER-CONTAINING POLYOLEFIN FILM, METHOD FOR PRODUCING MICROPOROUS STRETCHED CELLULOSE NANOFIBER-CONTAINING POLYOLEFIN FILM, AND SEPARATOR FOR NONAQUEOUS SECONDARY BATTERIES

TECHNICAL FIELD

The present invention relates to a method for producing a microporous stretched polyolefin film containing a cellulose nanofiber, a microporous stretched polyolefin film containing a cellulose nanofiber, and a separator for nonaqueous secondary batteries, and especially relates to a novel improvement for obtaining a microporous stretched film by dispersing a cellulose nanofiber in a polyolefin resin.

BACKGROUND ART

Heretofore, for example, separators for lithium ion batteries have been produced according to two processes, as broadly divided, of a wet process and a dry process. Of those, the present invention is classified into a wet process. One ordinary production process according to the wet process includes first mixing from about 60 to 80 parts by weight of paraffin which is a plasticizer in a high-molecular polyethylene, and then heating the mixture in a twin-screw extruder at a temperature not lower than the solubilization temperature thereof, followed by cooling on a sheet-forming casting roll to produce a sheet having a phase-separated structure. Next, the sheet is, while heated at a temperature not higher than the melting point thereof, stretched to thereby make the sheet secure air permeability and sheet strength, and thereafter the paraffin is removed using an organic solvent and the sheet is then dried, and finally the sheet is annealed at a temperature slightly higher than the stretching temperature thereof, thereby removing the sheet residual stress and expressing the necessary separator characteristics.

Regarding those proposed for improving the strength and the thermal characteristics of the basic separator characteristics of the separator mentioned above, Patent Document 1 exemplifies a nonaqueous electrolyte battery as well as a separator for nonaqueous electrolyte batteries and a production method thereof. The inorganic powder exemplified in the patent document includes titanium oxide, aluminium oxide, potassium titanate, etc.; and the inorganic fibers mentioned therein are those having an average fiber diameter of from 0.1 to 20 μm, and an average fiber length of from 0.1 to tens mm. With those, the patent document describes the effect of improving the separator characteristics. Similarly, Patent Document 2 shows an example of a glass fiber fabric-reinforced microporous polyolefin film with glass fibers compounded therein; Patent Document 3 shows a separator for lithium ion secondary batteries and a battery using the separator, in which an inorganic filler is applied to a nonwoven fabric; and Patent Document 4 illustrates a separator for batteries, a production method thereof and a battery, and shows a compound case with polypropylene therein. All of them are cases of improving the mechanical characteristics and thermal characteristics. Patent Document 5 provides a nanofiber production method, nanofibers, mixed nanofibers, a compounding method, a compound material and a molded article, relating to a process and an apparatus for cellulose production applicable to the present patent application.

Here, the basic functions of conventional separators are described. In a lithium ion battery, the separator is positioned between a positive electrode and a negative electrode, and exists in a state of holding an electrolyte in the open micropores therein. When given a load, the lithium ions in the positive electrode are deionized into the electrolyte while the electrons are left, then reach the negative electrode after having passed through the micropores of the separator, and are thus stored between the carbon lattices. At this time, the electrons are transferred to the negative electrode through the circuit, but the separator must be an insulator so as to prevent short-circuiting between the positive and negative electrodes. In addition, the separator for use in the lithium ion battery is required to have the ability not to prevent the ion conduction between the both electrodes, to hold an electrolyte therein, and to be resistant to the electrolyte. For preventing the separator from being broken owing to the pressure given thereto in electrode winding, or owing to the pressure also given thereto through expansion and contraction of electrodes in charging/discharging, or owing to the impact given thereto in falling of batteries, the separator is further required to have a high puncture strength. The high puncture strength is important for the reason that, when a lithium ion battery is degraded with time, lithium precipitates on the carbon negative electrode and crystallizes like needles thereon, thereby puncturing the separator to be in contact with the positive electrode to cause short-circuiting, and further causes a runaway risk owing to abnormal heat generation.

BACKGROUND ART DOCUMENT

Patent Document

Patent Document 1: JP-A 10-50287
Patent Document 2: JP-A 2004-269579
Patent Document 3: JP-A 2001-229908
Patent Document 4: JP-A 4-126352
Patent Document 5: JP-A 2009-293167

SUMMARY OF THE INVENTION

Problems that the Invention is to Solve

In general, a lithium ion battery may often have a risk of runaway reaction when the temperature thereof reaches from 130° C. to 140° C., and therefore the runaway reaction of the battery must be prevented by making the separator therein imperforate to thereby shut off the stream of lithium ions therethrough. However, the temperature at which the separator is made to be imperforated is set low, and therefore when a material having a low melting temperature is used, then the temperature difference in the range of from imperforation through micropores removal to shrinkage and melting is small, and as a result, the separator would be melted and broken before the heat generation runaway could not as yet go down, thereby causing short-circuiting between the positive and negative electrodes to further promote the runaway. In that manner, in general, the shut-down characteristic and the high-temperature resistance are in a relation of trade-off and therefore it is extremely difficult to satisfy both the two.

For improving the heat resistance and the strength of separators, heretofore there have been proposed a method of blending or laminating polyethylene and polypropylene, and a compounding method with reinforcing fibers such as glass fibers, aramid fibers, etc., as disclosed in Patent Documents 1 to 5 mentioned above. However, in the case where a blend of polyethylene and polypropylene is used as the starting material, it is difficult to uniformly knead them and, in particular, it was impossible to increase the molecular weight of polyethylene. In addition, the laminate porous film is expensive and is not practicable. Glass fibers and aramid fibers have a fiber diameter of 5 μm or more, but on the other hand, the thickness of the separator for lithium ion batteries is only from 5 to 20 μm or so; and consequently, those fibers would be broken in the film production process or would cause film surface unevenness, and therefore, porous films could not be well formed with the fibers. Thus, it was difficult to use conventional reinforcing fibers. Still on the other hand, the separator must be an insulating one, and there remains a problem that carbon fibers could not be used for enhancing the strength of the separator.

The present invention has been made for solving the existing problems mentioned above, and in particular, an object thereof is to attain simultaneously improving both the puncture strength and the short-circuit temperature among the mechanical and thermal characteristics that are required for the separator for lithium ion batteries, by compounding a polyolefin such as typically polyethylene and a fine cellulose nanofiber. Further, since application of a heat-resistant substance and use of a nonwoven fabric that have heretofore been employed for improving the characteristics increase the number of the necessary production steps thereby increasing the production cost, the present invention has enabled the cost cutting for future use for automobiles and for infrastructures. In addition, cellulose has other advantages of good environmental harmony at the time of disposal thereof and great abundance of availability thereof.

Further, the present invention provides a microporous film having a high puncture strength, excellent in both shut-down characteristics and high-temperature resistance after shut-down, and suitable for a separator for lithium batteries.

Means for Solving the Problems

A method for producing a microporous stretched polyolefin film containing a cellulose nanofiber according to the present invention is: a method including: a first step of melt-kneading a cellulose nanofiber in which at least a surface thereof is monoesterified and a polyolefin resin to thereby disperse the cellulose nanofiber in a polyolefin resin; a second step of removing water from a kneaded mixture obtained in the first step; a third step of mixing a plasticizer in the cellulose nanofiber and the polyolefin resin and melt-kneading them to prepare a polyolefin resin composition; a fourth step of extrusion-molding the polyolefin resin composition; a fifth step of stretching an extrusion-molded article obtained in the fourth step to form a film; and a sixth step of extracting the plasticizer from the film; the method in which the polyolefin resin with the cellulose nanofiber dispersed therein in a form of slurry is thermally fixed while the film is stretched at a temperature not higher than a melting point of the polyolefin resin, after extracting the plasticizer; the method in which a thickness of the film is within a range of from 5 μm to 50 μm; the method in which the film is a monolayer one or a multi-layer one, and when the film is the multilayer one, at least one layer of the film contains the cellulose nanofiber; the method in which an air permeability of the film is within a range of from 50 sec/100 cc to 1000 sec/100 cc; and the method in which a blend ratio of the cellulose nanofiber is from 0.01 wt % to 5 wt %. Additionally, a microporous stretched polyolefin film containing a cellulose nanofiber according to the present invention is configured to be produced according to the method for producing a microporous stretched polyolefin film containing a cellulose nanofiber. Furthermore, a separator for nonaqueous secondary batteries according to the present invention is configured to include the microporous stretched polyolefin film containing a cellulose nanofiber.

Advantage of the Invention

The method for producing a microporous stretched polyolefin film containing a cellulose nanofiber, the microporous stretched polyolefin film containing a cellulose nanofiber, and the separator for nonaqueous secondary batteries according to the present invention are configured as described above, and therefore attain the following effects.

Specifically, the method for producing a microporous stretched polyolefin film containing a cellulose nanofiber, the method including: a first step of melt-kneading a cellulose nanofiber in which at least a surface thereof is monoesterified and a polyolefin resin to thereby disperse the cellulose nanofiber in a polyolefin resin; a second step of removing water from a kneaded mixture obtained in the first step; a third step of mixing a plasticizer in the cellulose nanofiber and the polyolefin resin and melt-kneading them to prepare a polyolefin resin composition; a fourth step of extrusion-molding the polyolefin resin composition; a fifth step of stretching an extrusion-molded article obtained in the fourth step to form a film; and a sixth step of extracting the plasticizer from the film, is used. Therefore, since the cellulose nanofiber is mixed in and compounded with the polyolefin resin, the method makes it possible to produce a separator having improved mechanical strength and thermal characteristics and having improved safety as compared with conventional separators. In addition, a low-molecular-weight polyolefin resin having a relatively low molecular weight and easy to knead can be used to provide characteristics of a high-molecular-weight product that is difficult to produce, and therefore cost reduction can be expected and high environmental harmony and great industrial applicability can be expected.

In addition, mixing with the cellulose nanofiber improves the puncture strength of the film. Further, in the case of blending a cellulose nanofiber to a low-melting-point polymer, shut-down characteristics (imperforation at low temperature) can be adjusted. On the other hand, in the case of blending a cellulose nanofiber to a high-melting-point polymer, high-temperature resistance after shut-down can be obtained.

The thickness of the film may be within a range of from 5 μm to 50 μm, and therefore, a sufficient mechanical strength can be obtained.

The film may be a monolayer one or a multilayer one, and when the film is the multilayer one, at least one layer of the film contains the cellulose nanofibers. Therefore, a sufficient mechanical strength and a high puncture strength can be obtained.

The air permeability of the film may be within a range of from 50 sec/100 cc to 1000 sec/100 cc, and therefore, sufficient charge-discharge characteristics can be obtained.

The blend ratio of the cellulose nanofiber may be from 0.01 wt % to 5 wt %, and therefore, the fibers can be well entangled with each other, and the film can secure good electric insulation even though the amount of the cellulose nanofiber therein is small.

By producing according to the method for producing a microporous stretched polyolefin film containing a cellulose nanofiber, a film having the same effects as those of the films produced according to conventional production methods can be obtained.

Additionally, by using the polyolefin film containing a cellulose nanofiber, a separator for nonaqueous secondary batteries that has the same effects as those of the separators including a film produced according to a conventional production method can be obtained.

MODE FOR CARRYING OUT THE INVENTION

The invention has an object to obtain a microporous stretched film by dispersing a cellulose nanofiber in a polyolefin resin.

EXAMPLES

With reference to the drawings, preferred embodiments of the method for producing a microporous stretched polyolefin film containing a cellulose nanofiber, the microporous stretched polyolefin film containing a cellulose nanofiber and the separator for nonaqueous secondary batteries according to the present invention are described hereinunder.

First, the polyolefin resin in the invention is a polyolefin resin used in ordinary extrusion, injection, inflation, blow molding, etc., and homopolymers, copolymers, multi-stage polymers and the like of ethylene, propylene, 1-butene, 4-methyl-1-pentene, 1-hexene, 1-octene, etc can be used. Polyolefins selected from those homopolymers, copolymers and multi-stage polymers may be used either singly or as combined. Typical examples of the polymers include low-density polyethylene, linear low-density polyethylene, middle-density polyethylene, high-density polyethylene, ultra-high molecular-weight polyethylene, isotactic polypropylene, atactic polypropylene, ethylene-propylene random copolymer, polybutene and ethylene-propylene rubber. In case where the microporous film of the invention is used as a battery separator, especially preferred is use of a resin including high-density polyethylene as a main component thereof from the necessary requirements of low melting point and high strength, and from the viewpoint of shut-down characteristics, etc., it is desirable that a polyethylene resin accounts for 50% by weight or more of the resin component. When the amount of an ultra-high molecular-weight polyolefin having a molecular weight of 1,000,000 or more is more than 10 parts by weight, it becomes difficult to uniformly knead, and therefore, it is desirable that the amount thereof is 10 parts by weight or less.

Since the cellulose nanofiber for use in the invention have a nano-order-level fiber diameter and a part of the hydroxyl groups existing in the fiber surfaces are monoesterified with a polybasic acid, the cellulose nanofiber has a high uniform dispersibility with a polyolefin and can be kneaded and formed into sheets with ease, thereby providing a separator having more excellent mechanical characteristics and thermal characteristics than conventional separator characteristics.

Figure 5:
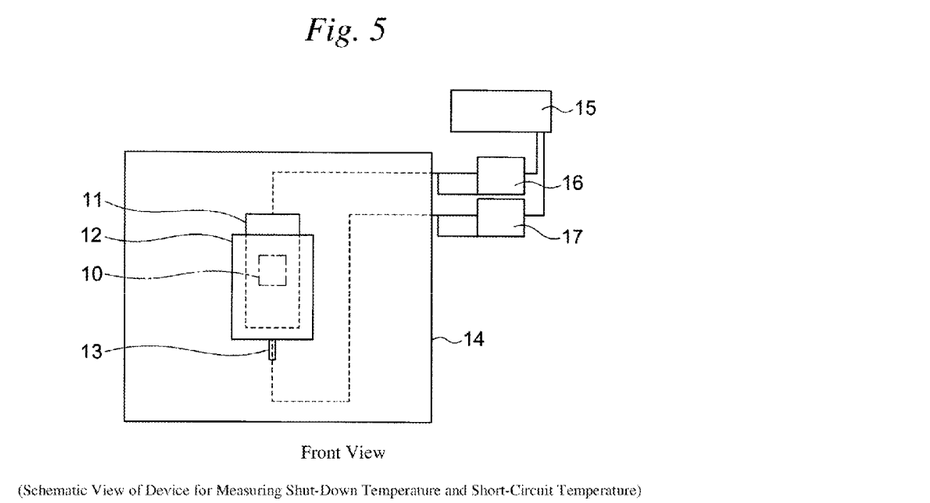
FIG. 5 is a schematic front configuration view of a measurement device for measuring the shut-down temperature and the short-circuit temperature for use in the invention.
Figure 6:
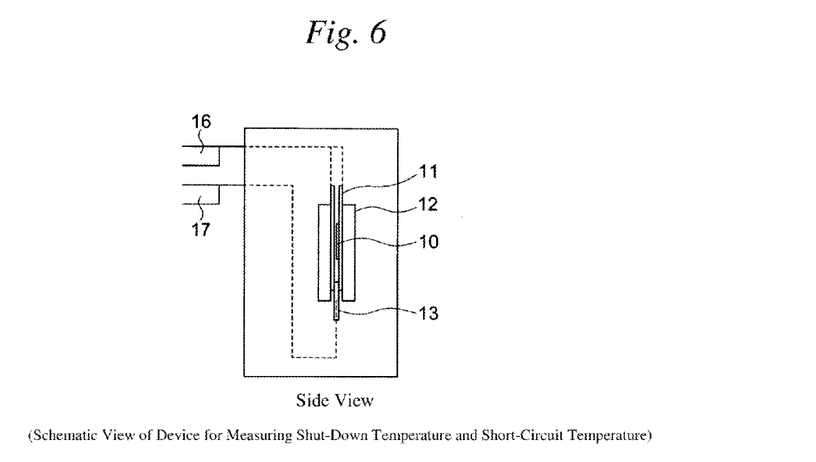
FIG. 6 is a side view of FIG. 5.

Examples of the invention are described below. However, the invention is not limited at all by these Examples, etc. Various characteristics of the microporous stretched film of the invention were evaluated according to the test methods mentioned below. (A) Film thickness and porosity: A sample was cut out into a size of 50 mm×50 mm square, and using a microgauge, the thickness of the sample sheet was measured at 25 points. The obtained data were averaged to be the film thickness. The porosity was calculated from the measured weight of the sheet and the theoretical weight thereof calculated from the density and the volume of the sheet. (B) Gurley value: For measurement of the Gurley value, used was a Gurley-type automated measuring instrument (by TESTING MACHINES INC: 58-03-01 kit). As stipulated in JIS P8177, the time taken until 100 cc of air passed through the sheet was referred to be the Gurley value. (C) Puncture strength: For measurement of the puncture strength, used was an automated puncture strength meter (by Kato Tech: KES-FB3-AUTO). The produced sheet was cut into a size of 50 mm square, and the puncture strength thereof was measured at different sites with intervals of 5 mm. The obtained data were averaged to give an average value. (D) DSC (Differential Scanning calorimeter: Using DSC (SII Nanotechnology's 220C), the sheet cut into a piece of 10 mg was measured. (E) Shut-down (SD) temperature, short-circuit (MD) temperature: FIG. 5 and FIG. 6 each show a schematic view of a measuring device for SD temperature and MD temperature. The microporous film (10) is impregnated with a specific electrolyte, and the film is fixed on an Ni foil. Another Ni foil is put on this so that the microporous film is sandwiched between the foils, and this is further sandwiched between glass plates from both sides thereof, and a thermocouple is fixed on the glass plates. This is heated from 25° C. to 200° C. at a rate of 2° C./min, and the temperature and the electric resistance of the sample are continuously measured. The electric resistance value is measured with an alternate current of 1 kHz. The shut-down temperature and the short-circuit temperature were defined as the temperature at which the electric resistance reaches $10^3 \Omega$ (F) FE-SEM observation: Using an ion-sputtering device (Elionix's ESC-101), platinum in a thickness of about 3 mm was vapor-deposited on the produced sheet; and using FE-SEM (JEOL's JSM-7000F), the surface of the sheet was microscopically observed. (G) Thermobalance measurement: Using TG-DTA (SII Nanotechnology's 220u), the sheet cut into a piece of 10 mg was measured. Alumina was used as the reference. The measurement was performed within a range of from 30° C. to 500° C. at a heating rate of 10° C./min.

Example 1

Figure 1:
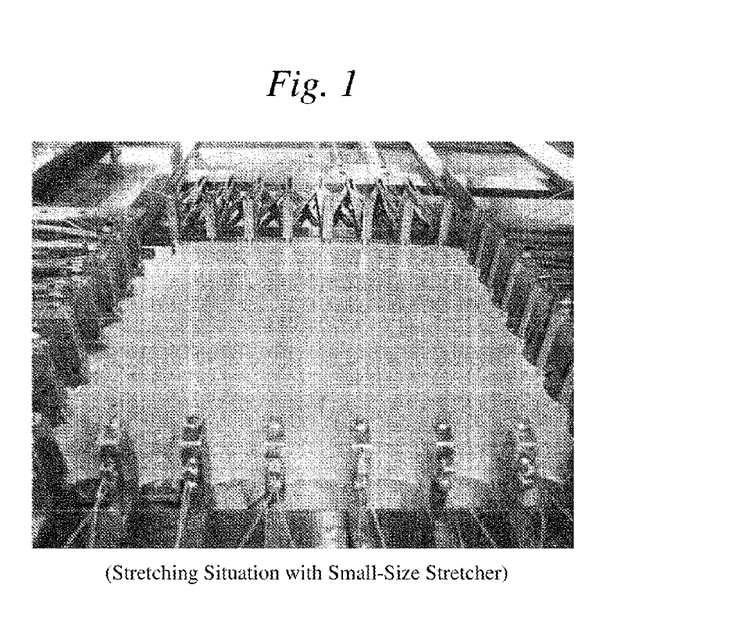
FIG. 1 is a configuration view showing a stretching situation of a film in the invention.

First, as a cellulose fiber material, 100 parts by weight of a cellulose fine powder (Nippon Chemical's KC Floc W400G) was put into a 500-mL pressure kneader serving as a reactor, then 5 parts of succinic anhydride was added thereto and reacted at 140° C. for 40 minutes to prepare a cellulose monoester product (Table 1, Material No. 1). Next, the obtained monoesterified cellulose was dissolved in water to prepare an aqueous 5% slurry, and using Starburst Minilabo (manufactured by Sugino Machine), this was processed for ultra-high-pressure countercurrent collision treatment to give an aqueous 0.5% slurry. This was mixed with HDPE (Prime Polymer's 7000F), then melt-kneaded in a twin-screw extruder equipped with a steam vent, and extruded and pelletized through a strand die to give a cellulose nanofiber-compounded polyolefin preblend material. Subsequently, the preblend material was mixed with paraffin in a ratio by weight of 40%:60%, and using a small-size kneader, this was processed for compounding with paraffin under the condition shown in Table 2, and thereafter cold-molded in a mold (100 mmϕ×1 mmH) to induce spinodal decomposition to form a disk sheet having the same shape as that of the mold. Next, using a small-size stretcher, the sheet was stretched with ease by 5×5 times, at a stretching temperature of 110° C. and at a stretching rate of 8000 mm/min in a mode of simultaneous biaxial stretching to provide a sample sheet. The stretching situation is shown in FIG. 1. The produced sheet was processed for simple degreasing with methylene chloride and dried, and then observed variously.

After the plasticizer is extracted out of the sheet, the sheet can be thermally fixed for preventing shrinkage while stretched slightly at a temperature not higher than the melting point of the polyolefin resin.

As the small-size stretcher, usable here is a known stretcher shown in FIG. 1 or a known mechanism illustrated in JP-A 2001-138394, etc.

Example 2

In the method of Example 1, maleic anhydride-modified polypropylene as a compatibilizing agent was added in an amount of 3% to a cellulose fine powder (KC Floc W400G) as a starting material, to make 100 parts by weight (Table 1, Material No. 2). Like in Example 1, the slurry of the obtained monoesterified cellulose and water was 0.5%.

Example 3

In the method of Example 1, 100 parts by weight of a cellulose fine powder (KC Floc W400G) was used as the starting material (Table 1, Material No. 3). This is the same as in Example 1 except that the slurry of the obtained monoesterified cellulose and water was 5%.

Example 4

In the method of Example 1, 100 parts by weight of a cellulose fine powder (Merck's Avicel) was used as the starting material (Table 1, Material No. 4). Like in Example 1, the slurry of the obtained monoesterified cellulose and water was 0.5%, and the other conditions were also the same as in Example 1.

Example 5

In the method of Example 1, BYK-P4101 (by BYK Japan) as a high-molecular dispersing agent was added in an amount of 1% to a cellulose fine powder (KC Floc W400G) as a starting material, to make 100 parts by weight (Table 1, Material No. 5). Like in Example 1, the slurry of the obtained monoesterified cellulose and water was 0.5%, and the other conditions were also the same as in Example 1.

Example 6

In the method of Example 1, BYK-P4101 (by BYK Japan) as a high-molecular dispersing agent was added in an amount of 1% to a cellulose fine powder (KC Floc W400G) as a starting material, to make 100 parts by weight (Table 1, Material No. 6). Like in Example 3, the slurry of the obtained monoesterified cellulose and water was 5%, and the other conditions were the same as in Example 1.

Comparative Example 1

In the method of Examples, HDPE alone with no cellulose added thereto was mixed with paraffin, however, the obtained web could not be well formed into sheet with a table tenter. Therefore, as a comparative material, Mitsui Hizex Million 030S (molecular weight: 500,000) and 145M (molecular weight: 1,150,000) were blended to give a starting material having a molecular weight of 570,000 in total, which was then mixed with an antioxidant (Irgafos 168) to make 30 parts by weight and further mixed with 70 parts by weight of paraffin (MORESCO's P350P). Using a twin-screw extruder, TEX65 (by JSW), the mixture was kneaded, and then sheeted through a T-die to give a web. The produced sheet was stretched by 5×5 times with a small-size stretcher as in FIG. 1, then paraffin was extracted out with methylene chloride in a simplified manner, and the resulting sheet was evaluated for the characteristics thereof.

Comparative Example 2

The characteristics of a standard separator generally used as a commercial product and having a molecular weight of 1,000,000 or so were evaluated in the same manner as above.

Figure 2:
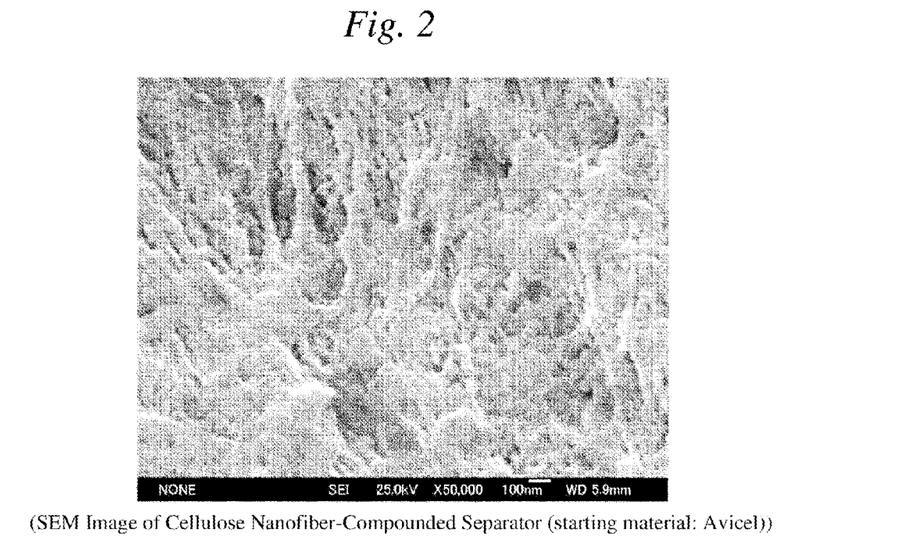
FIG. 2 is a SEM image of a cellulose nanofiber-compounded separator of the invention (in which the starting material is Avicel).

FIG. 2 shows an SEM image of Example 4. Since the stretching condition was not optimized, there is seen stretching unevenness, however, micropores and cellulose fibers are observed. In addition, sites are also observed, in which polyethylene is crystallized around the nuclei of cellulose fibers.

TABLE 1

(Cellulose-Compounded Preblend Olefin Material)

| | Material No. | Composition | Cellulose | Additive | Amount of MFC | Slurry Input | Slurry Concentration (cellulose/water) |
|---|---|---|---|---|---|---|---|
| Example 1 | 1 | HDPE + monoesterified MFC | KC Floc W400G | — | 0.1 phr | 20 phr | 0.5 wt % |
| Example 2 | 2 | HDPE + monoesterified MFC + compatibilizing agent (maleic anhydride-modified PP 3%) | KC Floc W400G | maleic anhydride-modified PPM: 3% added | 0.1 phr | 20 phr | 0.5 wt % |
| Example 3 | 3 | HDPE + monoesterified MFC | KC Floc W400G | — | 0.5 phr | 10 phr | 5 wt % |
| Example 4 | 4 | HDPE + monoesterified MFC | Avicel (MERCK) | — | 0.1 phr | 20 phr | 0.5 wt % |
| Example 5 | 5 | HDPE + monoesterified MFC + lubricant | KC Floc W400G | BYK-P4101: 1% added | 0.1 phr | 20 phr | 0.5 wt % |
| Example 6 | 6 | HDPE + monoesterified MFC + lubricant | KC Floc W400G | BYK-P4101: 1% added | 0.5 phr | 10 phr | 5 wt % |

In Table 1, MFC means microfibril cellulose.

TABLE 2

(Kneading Condition of Kneader)

| | |
|---|---|
| sample/paraffin (%) | 60/40 |
| kneading time (min) | 30 |
| kneading temperature (° C.) | 180 |
| pressing pressure (MPa) | 20 |
| pressing temperature (° C.) | 180 |

Figure 4:
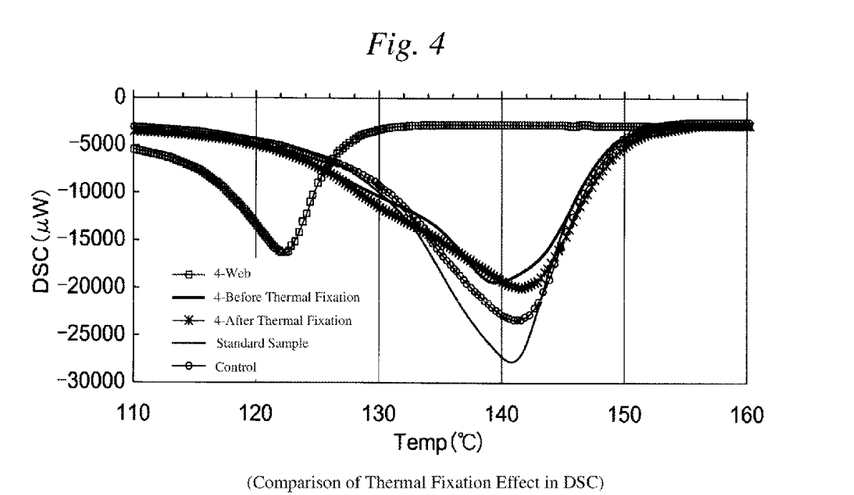
FIG. 4 shows comparative data of the thermal fixation effect of films by DSC in the invention.

Table 3 shows the characteristics of separators produced with 6 different types of materials. The stretching was not optimized and the samples were not thermally fixed, and therefore, the samples shrunk after degreasing. Except the material No. 1, all the materials have a high Gurley value and a low porosity. The optimum conditions for the stretching and the thermal fixation would have to be explored. However, in particular, it was found that the cellulose nanofiber-containing samples had a higher strength than the control which had a molecular weight of 570,000 and had been stretched in a stretching ratio of MD5×TD5. Similarly, it is known that, as compared with the standard sample (manufactured by Company A) in which the polyethylene average molecular weight was 1,000,000 or so, the cellulose nanofiber-containing samples have a high puncture strength. In general, mechanical strength greatly depends on the type of the starting material such as the molecular weight or the like thereof, and it is expected that the puncture strength of those samples not optimally stretched and having a low molecular weight would be lower than that of the control case and the standard sample manufactured by Company A; however, all those samples have a higher strength than the control case. This would be because of the effect of the cellulose nanofiber in those samples.

simplified thermal fixation comprises heating the sheet sample at 120° C. while the ends thereof were kept held, using a small-size stretcher, and provides an effect of relaxing the shrinkage owing to the residual stress generated in stretching. It is found that the sample that had been thermally fixed in a simplified manner had a higher melting point as compared with the sample not thermally fixed, and the calorific value peak position is lowered. This indicates that the simplified thermal fixation relaxed the thermal shrinkage and, as a result, the sheet was stretched and the crystallization thereof was promoted and further, the residual stress in the sheet was removed and therefore the thermal shrinkage property of the sheet could be thereby improved. For comparison, the DSC pattern of the web of the material No. 4 is shown in the graph, which indicates that, before stretched, the melting point and the peak position of the sheet were low and the crystallinity of the sheet was low. It is known that the stretching promotes crystallization and provides the heat resistant-improving effect of the stretched sheet in the manner as herein, and it is fully expected that optimization of the stretching condition for the cellulose nanofiber-compounded materials could improve the heat-resistance of the stretched sheets. Similarly, in addition, in case where polyethylene having a higher molecular weight that is used in ordinary separators is used, the heat resistance-improving effect could be further more expected than before and the thermal shrinkage property could be improved more.

FIG. 5 and FIG. 6 each show a schematic view of a measuring device for a shut-down temperature and a-short-circuit temperature. The microporous film 10 is impregnated with a specific electrolyte, and the film is fixed on the Ni foil 11. Another Ni foil 11 is put on this so that the microporous film 10 is sandwiched between the foils, and this is further sandwiched between the glass plates 12 from both sides thereof,

TABLE 3

(Typical Characteristic Values of Separator)

| | Material No. | Average Thickness (μm) | Porosity (%) | Gurley Value (s/100 cc) | DSC Peak (° C.) | Puncture Strength (gf through 25-μm sample) |
|---|---|---|---|---|---|---|
| Example 1 | 1 | 25 | 21.4 | 356 | 131.9 | 524 |
| Example 2 | 2 | 13 | 33.8 | 1000 | 132.8 | 411 |
| Example 3 | 3 | 27 | 9.34 | 3000 or more | 129.7 | 491 |
| Example 4 | 4 | 44 | 27.2 | 3000 or more | 139.6 | 567 |
| Example 5 | 5 | 18 | 18.1 | 3000 or more | 131.3 | 487 |
| Example 6 | 6 | 24 | 11.39 | 3000 or more | 131.3 | 602 |
| Comparative Example 1 | control | 24 | 46.23 | 340 | 141 | 370 |
| Comparative Example 2 | standard sample | 21 | 47.2 | 280 | 140.8 | 582 |

Figure 3:
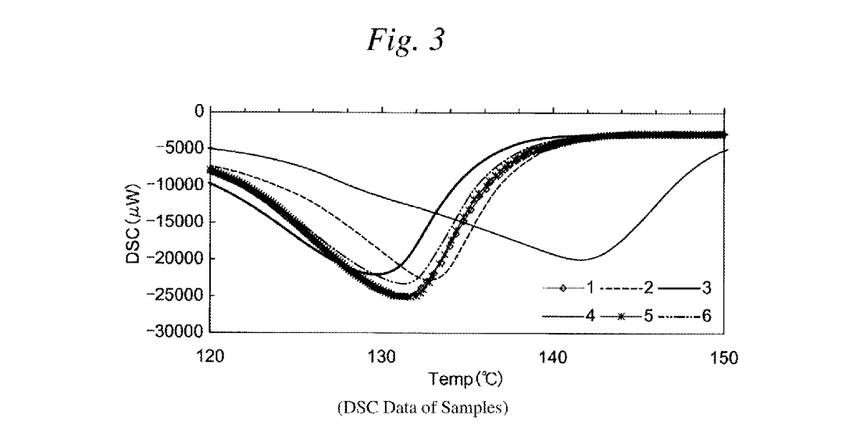
FIG. 3 shows DSC data of films produced experimentally in the invention.

Next, for confirming the effect of improving the thermal characteristics of the cellulose nanofiber-compounded materials, the materials were compared with each other in point of the melting point thereof measured through DSC, and the data are shown in FIG. 3. The DSC peak temperature in FIG. 3 is shown in Table 3 as the melting point. Almost all the samples had a melting point of around 130° C.; but among them, only the material No. 4 had a melting point of about 140° C. which is higher than that of the others. Like the puncture strength, the samples were compared with the control case, resulting in that all had nearly the same melting point. It is expected that by optimizing the sheet stretching to increase the degree of crystallization, the short-circuit temperature could be increased. FIG. 4 shows the DSC data of the samples thermally fixed in a simplified manner or not thermally fixed. The and the thermocouple 13 is fixed on the glass plates. In the heating furnace 14, this is heated from 25° C. to 200° C. at a rate of 2° C./min, and the temperature and the electric resistance of the sample are continuously measured. The electric resistance value is measured with an alternate current of 1 kHz. The shut-down temperature and the short-circuit temperature are defined as the temperature at which the electric resistance reaches $10^3 \Omega$.

The measured data are shown in Table 4. From the data, it is found that the shut-down temperature of Example 1 is 124.3° C. and the short-circuit temperature thereof is 200° C. or higher, namely, the sample has more excellent characteristics than the others. In Table 3, both the Gurley value and the puncture strength of the material No. 1 are the same level or more compared to those of the control case having a molecular weight of 570,000, namely, it may be said that the separator has well-balanced characteristics. The sample of Example 6 has a high short-circuit temperature, but the Gurley value thereof is also high, and therefore, the characteristics of the sample are not well balanced. However, when the Gurley value is improved by optimizing the stretching and the thermal fixation, then there can be provided a separator of which both the thermal characteristic and the mechanical characteristic are improved by compounding with cellulose.

In FIG. 5, 15 indicates a recorder, 16 indicates an electric resistance measurement device, and 17 indicates a calorimeter.

TABLE 4

(Results of Heat Resistance Evaluation)

| | Material No. | Shut-Down Temperature (SD) | Short-Circuit Temperature (MD) |
|---|---|---|---|
| Example 1 | 1 | 124.3° C. | 200° C. or higher |
| Example 2 | 2 | 126.2° C. | 154.4° C. |
| Example 3 | 3 | — | — |
| Example 4 | 4 | 130.8° C. | 138.7° C. |
| Example 5 | 5 | 122.8° C. | 142.0° C. |
| Example 6 | 6 | 119.2° C. | 200° C. or higher |
| Comparative Example 2 | standard sample | 110° C. to 120° C. | 130 to 140° C. |

Figure 7:
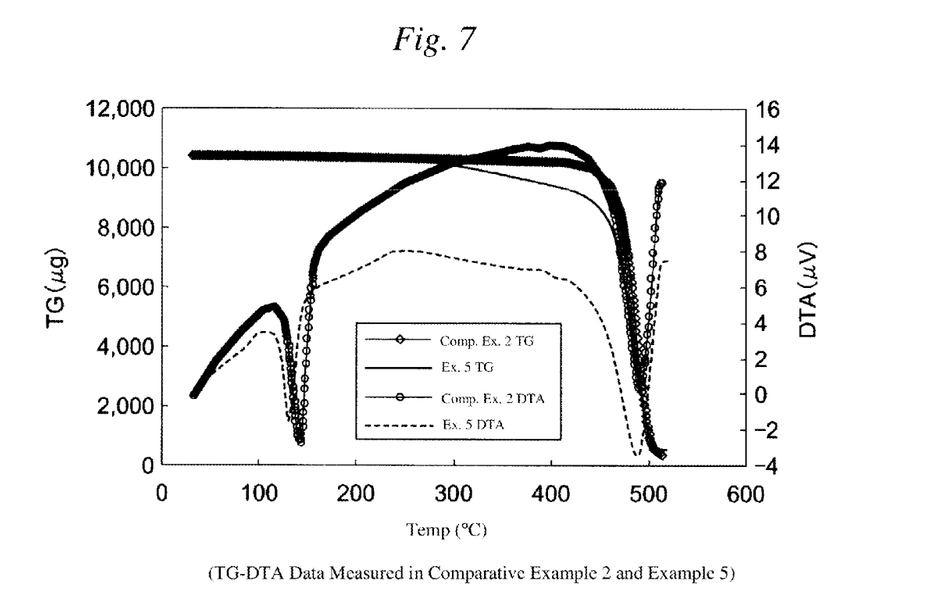
FIG. 7 shows TG-DTA data measured in Comparative Example 2 and Example 5.

For specifying the cellulose content in the filmy sheets, the sheets of Example 5 and Comparative Example 2 were analyzed through TG-DTA and the results are shown in FIG. 7. From the DTA data, the endothermic peak of the standard sample of Comparative Example 2 is seen at around 144° C., and the peak of the sample of Example 5 is at around 132° C. In this, the TG data do not show weight loss, and therefore the heat absorption would be through melting, which is common to the two. The DTA curves give heat absorption at around 490° C. and 500° C. both in Example 5 and Comparative Example 2. In this, the TG data show weight loss, and therefore the heat absorption would be through vaporization, which is also common to the two. Specifically, in Example 5, both the TG and DTA data show gentle weight loss and heat absorption from around 230° C. This would result from additive decomposition. Finally, in Comparative Example, all the substances vaporized, but in Example 5, about 2% residue remained, and this would be the cellulose contained in the separator.

Apart from the above, another cellulose identification method is described. A predetermined amount of a microporous film was added to a large excessive hot toluene, stirred and then kept statically to thereby make the contained cellulose nanofibers precipitate in the bottom of the container. The supernatant (toluene solution of HDPE, etc.) was removed through decantation, then a fresh hot toluene was added thereto, stirred and kept statically as such. The operation was repeated a few times, and finally the cellulose fibers were separated through filtration (or centrifugation), and the dry weight thereof was measured. As a result, it was found that the microporous film contains the cellulose nanofibers in an amount of 0.05 wt %. (However, in case of the composition in which maleic anhydride-modified PP is added to the matrix resin, the modified PP chemically bonds to the cellulose nanofibers therein and cannot be dissolved in the solvent, and in such a case, therefore, the weight of the modified resin must be subtracted from the weight of the undissolved residue.)

In the present invention, nano-order cellulose nanofibers of which the fiber diameter is on a nano-order level and which are finer than conventional ones are compounded with a polyolefin such as polyethylene or the like that is generally used for separators, to thereby improve the mechanical characteristics and the thermal characteristics of the sheet. In addition, the composition of the type can be readily formed into a sheet and the latitude in stretching it is broad. Thus, the invention can provide a separator for lithium ion batteries capable of providing an advantage of cost reduction.

The porous film of the invention may be a monolayer one or a multilayer one, and when the film is a multilayer one, at least one layer constituting the film may contain a cellulose nanofiber. The final film thickness is preferably within a range of from 5 μm to 50 μm. When the film thickness is 5 μm or more, the mechanical strength of the film is sufficient; and when the thickness thereof is 50 μm or less, the occupied volume of the separator is small and is therefore advantageous in point of battery capacity increase. The air permeability of the porous film of the invention is preferably within a range of from 50 sec/100 cc to 1000 sec/100 cc. When the film is used as a separator for batteries and when the air permeability thereof is 50 sec/100 cc or more, a risk of self-discharge is low; and when the air permeability thereof is 1000 sec/100 cc or less, good charge-discharge characteristics can be obtained.

The present invention is compared with Patent Document 1 (precedent relating to shut-down characteristics and high-temperature resistance effect in mixing with inorganic fibers). Patent Document 1 describes that, in order to keep the electric insulation after polymer melting through addition of inorganic fibers, the blend ratio of the fibers must be at least 20 wt %.

The cellulose nanofiber (hereinafter abbreviated as N-CeF) for use in the present invention is finer and more flexible than these inorganic fibers, and therefore the nanofiber can be readily entangled with each other. Even though the specific gravity difference (about 4 times) between 0.05 wt % inorganic fibers and N-CeF is taken into consideration, the present invention has realized the securing of electric insulation after polymer melting in a blend ratio far lower than in Patent Document 1. In addition, another advantage of the reduction in the amount of the fibers to be added is that the kneader scale can be reduced and the system cost can be cut down. Regarding the content of the cellulose nanofiber, the residue in TG-DTA result is around 2 wt %, and according to the method of dissolving in hot toluene, the residue is around 0.05 wt %. Therefore, the content can be from 0.01 wt % to 5 wt % or so. The preferred range of the content is from 0.05 wt % to 2 wt %.

Regarding the cost of the starting material itself, N-CeF is not inexpensive at present, however, inexpensive material supply through mass-production can be expected in a future market to be realized.

Regarding the blend ratio of N-CeF in separators in direct mixing thereof into resin, it has heretofore been known that thinner and electrically-insulating fibers must be selected. Regarding N-CeF, however, no one has succeeded in finding out the mixing conditions capable of satisfying the requirements that N-CeF and a polyolefin resin which is a resin for separators are adapted to a process of separator production, namely, that N-CeF is homogeneously dispersed in the resin with no aggregation therein, that the fibers are not separated from the resin during stretching, and that the fibers do not interfere with the formation of micropores in separators.

This time, these requirements are satisfied by monoesterifying the surface of N-CeF, thereby being able to produce the separator with N-CeF mixed therein, and as a result, the expected improvement of the puncture strength through incorporation of N-CeF and the securing of the electric insulation after polymer melting can be realized.

The embodiments of the above-mentioned Examples 1 to 6 are summarized as follows.

A method for producing a microporous stretched polyolefin film containing a cellulose nanofiber, the method including: a first step of melt-kneading a surface-monoesterified cellulose nanofiber and a polyolefin resin to thereby disperse the cellulose nanofiber in a polyolefin resin; a second step of removing water from a kneaded mixture obtained in the first step; a third step of mixing a plasticizer in the cellulose nanofiber and the polyolefin resin and melt-kneading them to prepare a polyolefin resin composition; a fourth step of extrusion-molding the polyolefin resin composition; a fifth step of stretching an extrusion-molded article obtained in the fourth step to form a film; and a sixth step of extracting the plasticizer from the film.

The method for producing a microporous stretched polyolefin film containing a cellulose nanofiber, in which the polyolefin resin with the cellulose nanofiber dispersed therein in a form of slurry is thermally fixed while the film is stretched at a temperature not higher than a melting point of the polyolefin resin, after extracting the plasticizer.

The method for producing a microporous stretched polyolefin film containing a cellulose nanofiber, in which a thickness of the film is within a range of from 5 μm to 50 μm.

The method for producing a microporous stretched polyolefin film containing a cellulose nanofiber, in which the film is a monolayer one or a multilayer one, and when the film is the multilayer one, at least one layer of the film contains the cellulose nanofiber.

The method for producing a microporous stretched polyolefin film containing a cellulose nanofiber, in which an air permeability of the film is within a range of from 50 sec/100 cc to 1000 sec/100 cc.

The method for producing a microporous stretched polyolefin film containing a cellulose nanofiber, in which a blend ratio of the cellulose nanofiber is from 0.01 wt % to 5 wt %.

A microporous stretched polyolefin film containing a cellulose nanofiber, which is produced according to the method for producing a microporous stretched polyolefin film containing a cellulose nanofiber.

A separator for nonaqueous secondary batteries, including the microporous stretched polyolefin film containing a cellulose nanofiber.

The invention has been described in detail with reference to specific embodiments thereof, however, it is obvious to anyone skilled in the art that various modifications and changes can be given to the invention not overstepping the spirit and the scope of the invention.

The present application is based on a Japanese patent application No. 2011-194754 filed on Sep. 7, 2011, and the contents thereof are incorporated herein by reference.

INDUSTRIAL APPLICABILITY

According to the invention, by dispersing a cellulose nanofiber in a polyolefin resin, it is possible to obtain a method for producing a microporous stretched polyolefin film containing a cellulose nanofiber, a microporous stretched polyolefin film containing a cellulose nanofiber, and a separator for nonaqueous secondary batteries.

DESCRIPTION OF REFERENCE NUMERALS AND SIGNS

10 Microporous Film
11 Ni Foil
12 Glass Plate
13 Thermocouple
14 Heating Furnace
15 Recorder
16 Electric Resistance Measurement Device
17 Calorimeter

The invention claimed is:

1. A method for producing a microporous stretched polyolefin film containing a cellulose nanofiber, the method comprising: a first step of melt-kneading a surface-monoesterified cellulose nanofiber in an aqueous slurry and a polyolefin resin to thereby disperse the cellulose nanofiber in a polyolefin resin; a second step of removing water from a kneaded mixture obtained in the first step; a third step of mixing a plasticizer in the cellulose nanofiber and the polyolefin resin and melt-kneading them to prepare a polyolefin resin composition; a fourth step of extrusion-molding the polyolefin resin composition; a fifth step of stretching an extrusion-molded article obtained in the fourth step to form a film; and a sixth step of extracting the plasticizer from the film.

2. The method for producing a microporous stretched polyolefin film containing a cellulose nanofiber according to claim 1, wherein the polyolefin resin with the cellulose nanofiber dispersed therein in the aqueous slurry is thermally fixed while the film is stretched at a temperature not higher than a melting point of the polyolefin resin, after extracting the plasticizer.

3. The method for producing a microporous stretched polyolefin film containing a cellulose nanofiber according to claim 1, wherein a thickness of the film is within a range of from 5 μm to 50 μm.

4. The method for producing a microporous stretched polyolefin film containing a cellulose nanofiber according to claim 1, wherein the film is a monolayer one or a multilayer one, and when the film is the multilayer one, at least one layer of the film contains the cellulose nanofiber.

5. The method for producing a microporous stretched polyolefin film containing a cellulose nanofiber according to claim 1, wherein an air permeability of the film is within a range of from 50 sec/100 cc to 1000 sec/100 cc.

6. The method for producing a microporous stretched polyolefin film containing a cellulose nanofiber according to claim 1, wherein a concentration of the cellulose nanofiber in the aqueous slurry is from 0.01 wt % to 5 wt %.

7. A microporous stretched polyolefin film containing a cellulose nanofiber, which is produced according to the method for producing a microporous stretched polyolefin film containing a cellulose nanofiber according to claim 1.

8. A separator for nonaqueous secondary batteries, comprising the microporous stretched polyolefin film containing a cellulose nanofiber according to claim 7.

* * * * *